W. H. TRENWITH.
Traction Wheel.
No. 196,843. Patented Nov. 6, 1877.
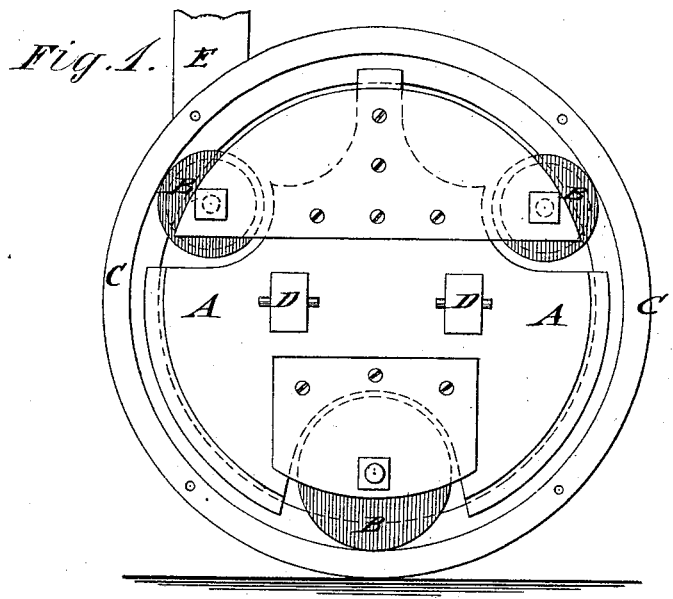
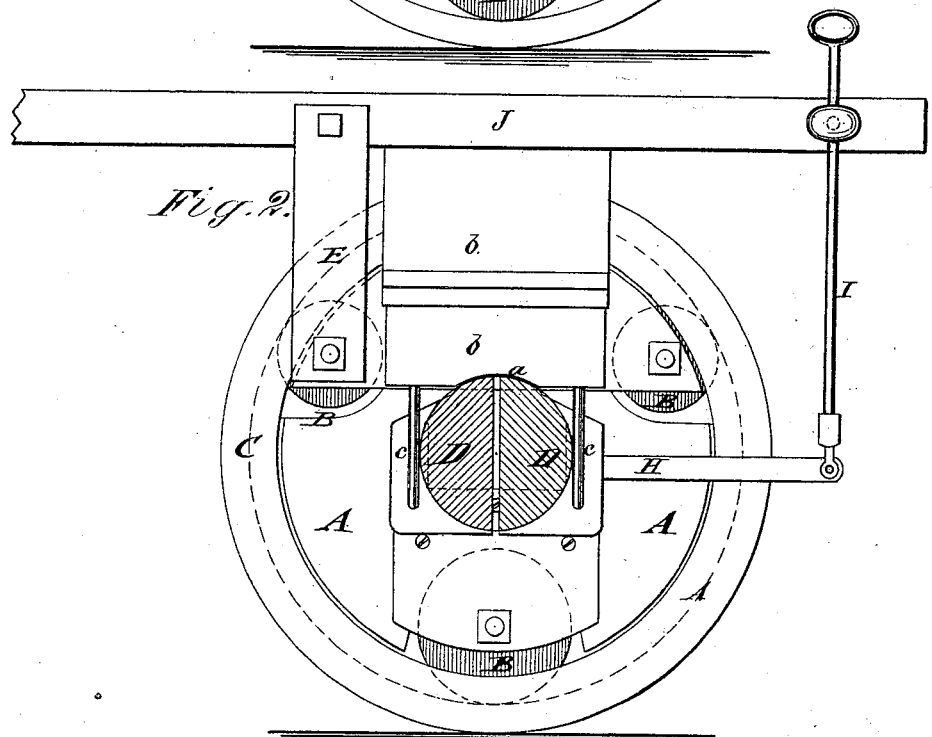
WITNESSES:
H. Rydquist
J. H. Scarborough
INVENTOR:
W. H. Trenwith
BY Munn & Co
ATTORNEYS.

UNITED STATES PATENT OFFICE.

WILLIAM H. TRENWITH, OF NEW YORK, N. Y.

IMPROVEMENT IN TRACTION-WHEELS.

Specification forming part of Letters Patent No. 196,843, dated November 6, 1877; application filed September 1, 1877.

*To all whom it may concern:*

Be it known that I, WILLIAM H. TRENWITH, of New York city, in the county and State of New York, have invented a new and Improved Wheel for Vehicles, of which the following is a specification:

In the accompanying drawing, Figure 1 represents a side elevation of my improved wheel for vehicles; and Fig. 2 shows an elevation of the wheel from the inside, and in section through the compound axle.

Similar letters of reference indicate corresponding parts.

This invention is intended to so improve the wheel for vehicles for which Letters Patent have been granted to me, under date of December 3, 1872, and numbered 133,605, that the weight of the vehicle and its load may be utilized in superior manner in advancing and retarding the vehicle, so as to furnish simple and reliable means for starting and stopping the same, without the use of brakes or other mechanism.

The invention consists, essentially, of a movable web or center section supported on rollers or wheels arranged within a revolving traction-wheel of larger diameter, the web supporting an axle made of two symmetrical sections, to one section of which suitable operating mechanism is applied.

By referring to the drawing, A represents the movable web or center section of my improved wheel for vehicles, which is provided with three or more anti-friction rollers or wheels, B, that run in the flanged interior of a revolving wheel, C. The recesses arranged for the rollers B in the web or center section may be covered by face-plates to keep out the dust.

A pair of wheels is connected by a compound axle, D, which is made of two sections, applied rigidly to the web at the ends and symmetrically to the axis of the wheels.

H is an arm projecting from one section, D, of the compound axle, and connected at its outer extremity to a rod, I, which passes upward through the body of the vehicle J, and serves as a means of changing the position of the wheels B in the wheel C, so as to throw the weight thereof, together with the superincumbent weight of the vehicle and its load, forward or backward of a perpendicular line dropped through the axis of the axle, whereby the gravity of the load is utilized in moving the vehicle in a forward or backward direction, according as the axle is turned in one or the other direction.

In analogous manner, the retarding and stopping of the vehicle are obtained by raising the axle-section and causing the center of gravity of the vehicle and load to fall back of the axis of the wheels.

The body of the vehicle is supported upon the cylindrical portion $a$, of the compound axle by an interposed bolster, $b$, pins $c$, projecting downwardly therefrom and embracing cylindrical portions of the axle, serving to keep the vehicle-body from independent longitudinal movement upon its axles.

The movable web-sections of the wheels are connected at the rear portions with the vehicle-body by means of rubber or other springs E, that prevent the weight of the load from pressing on that side of the wheels, and so increase the weight on the other side of the wheels.

The compound axle is made of two sections at both sides of the center, to bring, by the pressure on one section, the weight of the vehicle and load forward or backward of the axis of the wheels.

Having thus described my invention, what I claim as new, and desire to secure by Letters Patent, is—

1. The combination of a movable interior or web section having rollers or wheels and of an outer revolving traction-wheel with a compound axle attached rigidly to web-section, as and for the purpose specified.

2. The combination of the movable web-sections having anti-friction rollers and the outer revolving traction-wheels with the compound axle, the sections of which are arranged symmetrically to the axis of the wheels, and connected rigidly to the web-sections, substantially as specified.

WILLIAM H. TRENWITH.

Witnesses:
 PAUL GOEPEL,
 ALFRED LURCOTT.